(12) United States Patent
Capron (10) Patent No.: US 12,030,760 B2
(45) Date of Patent: Jul. 9, 2024

(54) METHOD AND DEVICE FOR HELPING TO POSITION FORKS OF A HANDLING MACHINE

(71) Applicant: Michel Capron, Hochstatt (FR)

(72) Inventor: Michel Capron, Hochstatt (FR)

( * ) Notice: Subject to any disclaimer, the term of this patent is extended or adjusted under 35 U.S.C. 154(b) by 493 days.

(21) Appl. No.: 17/296,582

(22) PCT Filed: Nov. 24, 2019

(86) PCT No.: PCT/FR2019/000188
§ 371 (c)(1),
(2) Date: May 25, 2021

(87) PCT Pub. No.: WO2020/109677
PCT Pub. Date: Jun. 4, 2020

(65) Prior Publication Data
US 2021/0403298 A1    Dec. 30, 2021

(30) Foreign Application Priority Data

Nov. 28, 2018    (FR) ...................................... 1872027

(51) Int. Cl.
*B66F 9/00*    (2006.01)
*B66F 9/075*    (2006.01)
(Continued)

(52) U.S. Cl.
CPC ........ *B66F 9/0755* (2013.01); *G05B 19/4155* (2013.01); *G05B 2219/35414* (2013.01); *G05B 2219/45049* (2013.01)

(58) Field of Classification Search
CPC ...... B66F 9/0755; B66F 9/00; G05B 19/4155; G05B 2219/35414; G05B 2219/45049; G05B 19/00
See application file for complete search history.

(56) References Cited

U.S. PATENT DOCUMENTS

| | | | | |
|---|---|---|---|---|
| 4,747,610 A | * | 5/1988 | Yingling | ............... B62B 3/0612 280/43.12 |
| 6,411,210 B1 | * | 6/2002 | Sower | ................... B66F 9/0755 340/686.2 |

(Continued)

FOREIGN PATENT DOCUMENTS

| EP | 985632 A1 | * | 3/2000 | ............ B66F 9/0755 |
|---|---|---|---|---|
| FR | 2 922 201 B1 | | 3/2010 | |
| WO | WO 2017/087109 A1 | | 5/2017 | |

OTHER PUBLICATIONS

International Search Report mailed Apr. 20, 2020 in corresponding PCT International Application No. PCT/FR2019/000188.

(Continued)

*Primary Examiner* — Yonel Beaulieu
(74) *Attorney, Agent, or Firm* — OSTROLENK FABER LLP (57) ABSTRACT

A method and device allowing a driver of a handling machine of the forklift type to position and introduce, in complete safety, the forks of the machine under a load to be handled. A light-beam that projects a luminous mark onto the load to be handled informs the driver of the relative position of the forks with respect to the load to be handled. The light-beam is activated and adjusted depending on the different steps of handling and inclination of the forks, which, for their part, are identified solely on the basis of the measurement of the acceleration acting on the forks. The device, which is installed quickly and protected effectively against collisions, has a high degree of operational autonomy. It improves working conditions and reduces product losses.

8 Claims, 4 Drawing Sheets

(51) Int. Cl.
G05B 19/41 (2006.01)
G05B 19/4155 (2006.01)

(56) References Cited

U.S. PATENT DOCUMENTS

| | | | |
|---|---|---|---|
| 10,859,998 B2* | 12/2020 | Marsee | B66F 9/24 |
| 2002/0117607 A1 | 8/2002 | Goddard | 250/221 |
| 2005/0055880 A1* | 3/2005 | Gierl | E05F 15/42 49/26 |
| 2012/0060383 A1* | 3/2012 | Goddard | B66F 9/0755 33/299 |
| 2013/0182237 A1* | 7/2013 | Viereck | B66F 9/0755 356/3 |
| 2018/0370780 A1* | 12/2018 | Marsee | B66F 9/0755 |

OTHER PUBLICATIONS

Written Opinion mailed Apr. 20, 2020 in corresponding PCT International Application No. PCT/FR2019/000188.

* cited by examiner

METHOD AND DEVICE FOR HELPING TO POSITION FORKS OF A HANDLING MACHINE

CROSS-REFERENCE TO RELATED APPLICATIONS

The present application is a 35 U.S.C. §§ 371 national phase conversion of PCT/FR2019/000188, filed Nov. 24, 2019, which claims priority to French Patent Application No. 1872027, filed Nov. 28, 2018, the contents of which are incorporated herein by reference. The PCT International Application was published in the French language.

TECHNICAL FIELD

The present invention relates to a method for assisting in the positioning of the arms of forks of a fork-lift handling machine which, by means of a light beam projecting a light mark onto a load to be handled, informs the driver of said handling machine of the relative position of said arms of said forks with respect to said load to be handled to allow him or her to appropriately position said arms of said forks before inserting them, in total safety, under said load to be handled.

It relates also to a device for assisting in the positioning of the arms of forks of a fork-lift handling machine which, by means of a light beam projecting a light mark onto a load to be handled, informs the driver of said handling machine of the relative position of said arms of said forks with respect to said load to be handled to allow him or her to appropriately position said arms of said forks before inserting them, in total safety, under said load to be handled, for the implementation of the method.

PRIOR ART

The present invention lies more particularly within the field of the methods and devices which, from a handling machine, send a light mark onto the load to be handled to allow the driver of the machine to best assess the relative position of the forks of his or her machine with respect to a load to be handled.

The drivers of fork-lift handling machines are constantly confronted with the difficulty of inserting the forks under the load to be handled whether this load is placed on a pallet or on any other chocking means. Indeed, the driver generally has little space for inserting his or her forks, the visibility that he or she has of his or her environment is reduced because of the presence between him or her and the load of the mast of the machine and its apron. Very often, he or she has to search for his or her loads at height, then confronted with parallax issues. This difficulty creates losses of time in the handling of the loads and sometimes the loads are affected, then provoking product losses. There is therefore a real need and a certain economical benefit in resolving this problem of load handling using a fork-lift machine in the best possible way.

There are many systems offering a solution to the above-mentioned problem, in particular the American patent US 2002117607 in the name of Goddard, and the French patent FR 2922201 in the name of Demangeat. These patents also include drawbacks, in particular:
the installation of the device on the machine and the settings are neither easy nor rapid;
the device is inadequately protected from possible collisions with the loads to be handled;
the driver receives no information on the inclination value of the forks of his or her machine;
with the light mark being activated in an uncommanded manner, the autonomy of the device is penalized when the latter is powered by batteries;
the technology retained allows neither the operation of the method implemented to be adjusted easily, nor new functionalities to be added.

SUMMARY OF THE INVENTION

The present invention sets out to provide a method and a device which addresses all of the requirements expressed by the practitioners in load handling. To this end, the method and the device which devolves therefrom make it possible to effectively satisfy the constraints discussed above that the known assistance devices are not able to satisfy.

This objective is achieved by the method for assisting in the handling of a load according to the invention, as defined in the preamble and characterized in that the light beam is activated during at least one step chosen from among the set of the steps of the handling process, said step being identified by computations and analyses relating solely to the measurement of the total acceleration vector acting on the forks, said total acceleration vector being by its nature the resultant of the gravity acceleration vector and of the displacement vector of the forks.

According to a preferred embodiment, the light beam is activated during the step of picking up of the load to be handled, said pick-up step being identified, continuously, by the following phases of said method:
extraction of the displacement acceleration vector of the total acceleration vector of the forks,
extraction of the two component vectors of said displacement acceleration vector of the forks,
computation, by mathematical double integration with respect to time relating to said two component vectors, of the speeds and of the horizontal and vertical displacements of the forks,
verification that said forks are currently being displaced vertically and that their horizontal displacement is slow, or even zero.

In a particular embodiment of the method, the light beam is rendered inactive if the height of the arms of the forks with respect to the ground lies between two predetermined height values, the value of said height of said arms of said forks being identified and compared to said two predetermined height values, continuously, by the following phases of said method:
extraction of the displacement acceleration vector of the total acceleration vector of the forks,
extraction of the vertical component vector of said displacement acceleration vector of the forks,
computation, by mathematical double integration with respect to time relating to said vertical component vector, of the speed and of the vertical displacement of said forks,
computation of the height of the forks by the summation of said vertical displacements,
verification that said height of said forks lies between said two predetermined height values.

Advantageously, the light beam is activated when the angle of inclination of the arms of the forks with respect to the horizontal lies between two predetermined angular values, the value of said angle of inclination of said arms of said forks being identified, continuously, by the following phases of said method:

extraction of the gravity acceleration vector of the total acceleration vector, extraction of the component vectors of said gravity acceleration vector according to an orthonormal reference frame that inclines with said forks, computation of said angle of inclination of said arms of said forks with respect to a horizontal by trigonometrical computation on said two component vectors of said gravity acceleration vector, verification that said angle of inclination lies between said two predetermined angular values.

In a particular embodiment, the light beam is activated and modulated according to different modes as a function of the angle of inclination of said arms of said forks with respect to the horizontal:

a first mode when said angle of inclination of said arms of said forks lies within an angular range close to the horizontal, a second mode when said angle of inclination of said arms of said forks lies within an angular range above the horizontal, a third mode when said angle of inclination of said arms of said forks lies within an angular range below the horizontal, the value of said angle of inclination of said arms of said forks being identified and compared to said angular ranges, continuously, by the following phases of said method:

extraction of the gravity acceleration vector of the total acceleration vector, extraction of the component vectors of said gravity acceleration vector according to an orthonormal reference frame that inclines with said forks, computation of the angle of inclination of said arms of said forks with respect to a horizontal by trigonometrical computation on said component vectors of said gravity acceleration, verification that said angle of inclination lies within one of said different angular ranges.

A device for assisting in the positioning of the arms of forks of a fork-lift handling machine, for the implementation of the method described above, characterized in that it comprises:

a hollow body, on the one hand installed on one of said forks and on the other hand containing an electronic means, said electronic means implementing an electrical battery, an accelerometer, a programmable microcontroller and a module for emitting a light beam, said accelerometer continuously measuring the total acceleration vector acting on the forks, said microcontroller, being on the one hand loaded with a computer program, and on the other hand receiving the information from said accelerometer:

determines by computations, continuously, the values of the components of the gravity acceleration vector, the values of the component vectors of the displacement acceleration vector, the inclination values, the speeds, displacements and horizontal and vertical positions of said forks, identifies, as a function of the computed values, the current handling step, controls the operation of said light beam-emitting module as a function, on the one hand, of the identified handling step and, on the other hand, of said program.

According to a preferential design, the body is comprised of a hollow cylindrical housing closed by a top plug and a bottom plug, said body being linked to the fork by means of at least one rapid tie, itself comprised:

of a circular clamp, adjustable in diameter and placed on said housing, of a magnetic means placed on said fork, of an elastic means, on the one hand secured to said clamp and on the other hand secured to said magnetic means.

Advantageously, the clamp is of screw clamp type, the elastic means is a block of rubber, the magnetic means is a pot magnet.

According to a particular embodiment of the invention, an indexing means of the magnetic means is secured to the fork, said indexing means being comprised of a thin plate secured to said fork, said plate having at least one piercing for receiving and indexing, accurately, said magnetic means on said fork.

According to a variant of the invention, the microcontroller is loaded with a computer program which can be remotely modified, by wireless link, by means:

of a transceiver module, of Bluetooth type, placed on the electronic means, of a smartphone, on the one hand outside the device, and on the other hand provided with a dedicated communication application, said smartphone being able to communicate wirelessly with said transceiver module.

DESCRIPTION OF THE FIGURES

The attached figures illustrate an advantageous embodiment of the invention.

DETAILED DESCRIPTION OF THE INVENTION

Figure 1:
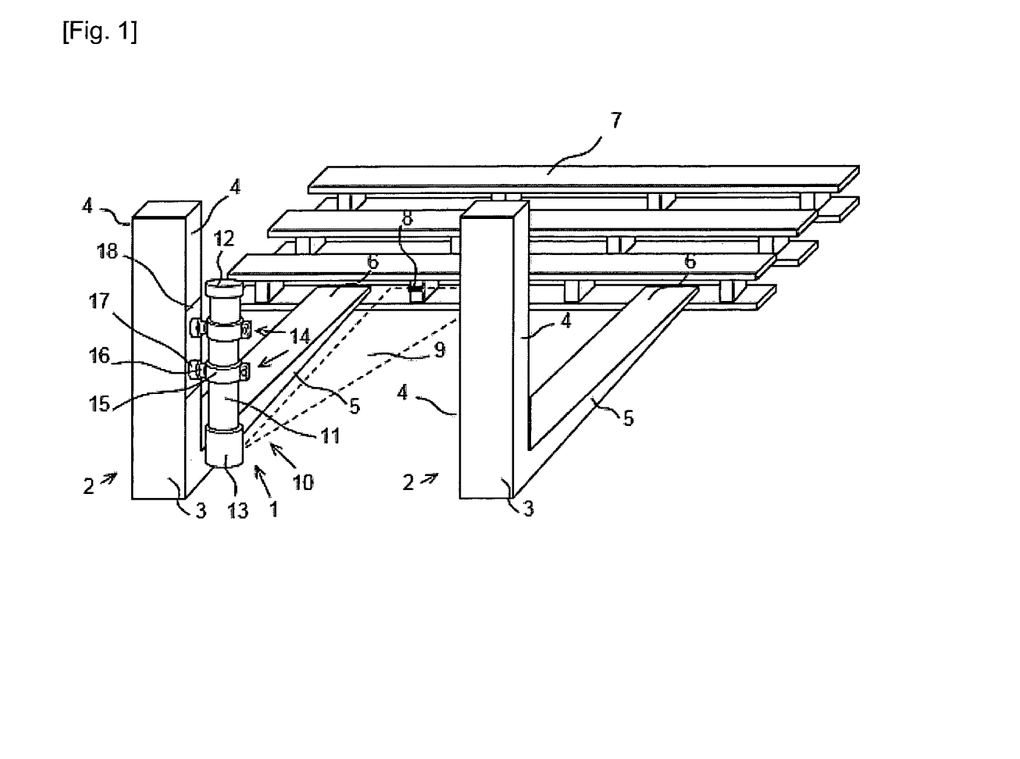
FIG. 1 represents a perspective view of the forks of the machine equipped with the device of the invention before the forks are inserted under the load to be handled.
Figure 2:
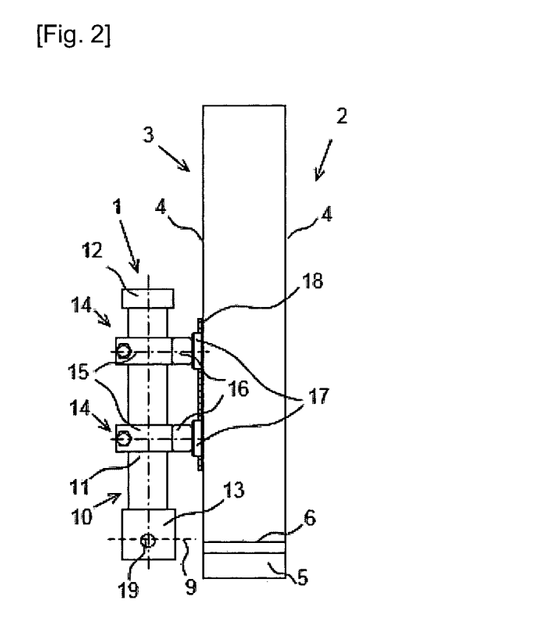
FIG. 2 represents a front view of the device of the invention installed on the side of the fork upright, FIG. 3 corresponds to FIG. 2 and represents a side view of the device of the invention installed on the side of the fork upright.
Figure 3:
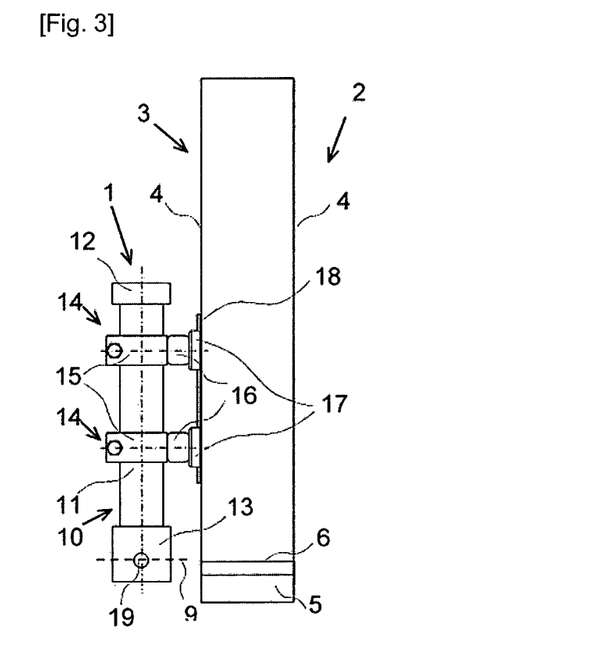

With reference to FIGS. 1, 2 and 3.

The device (1) of the invention, comprised of a body (10) of elongate form, of two rapid ties (14) and of an indexing means (18), is placed on the lateral face (4) of the upright (3) of the fork (2). This is in fact a point where the device (1) is particularly protected from collisions with the loads (7) to be handled. According to other variants, not represented, the device (1) will be able to be placed elsewhere on the fork (2)

and even more generally on any element secured to the forks (2) and in particular on the apron or the mast of the machine.

Figure 4:
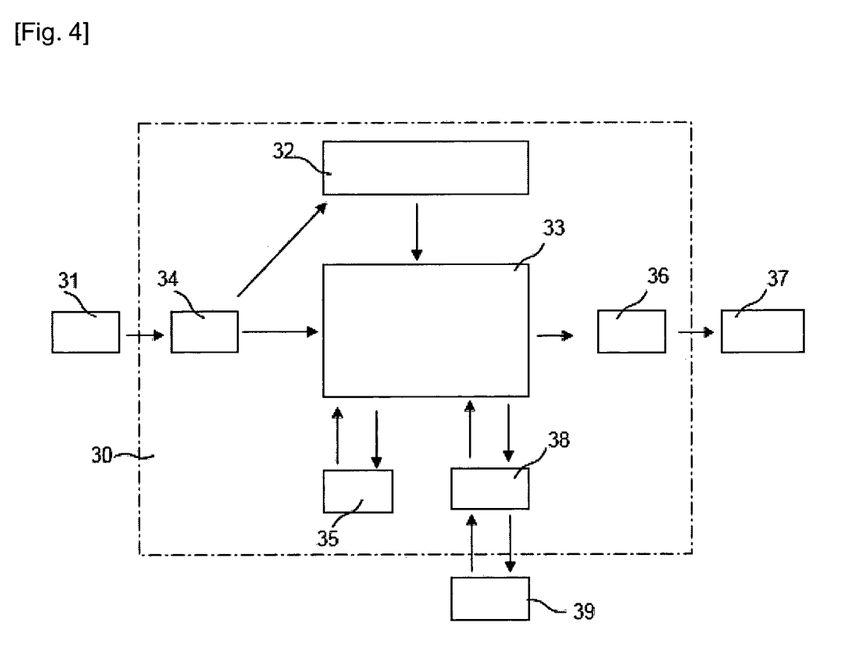
FIG. 4 is a block diagram of operation of the electronic means implemented by the device of the invention.

The body (10) is comprised of a cylindrical hollow housing (11) closed by a top plug (12) and a bottom plug (13). In FIG. 4, body (10) contains the electronic means which implements mainly an electrical battery (31), an accelerometer (32), a programmable microcontroller (33) and a module (37) for emitting a light beam (9). The removable top plug (12) allows access to and the replacement of the batteries (31). The bottom plug (13), pierced with a hole (19), itself provided with a transparent flat lens, allows the passage of the light beam (9) emitted by the emitter module (37).

The two rapid ties (14) which allow the body (10) to be linked to the fork (2) are each composed of a circular clamp (15), adjustable in diameter and placed on the housing (11), of a magnetic means (17) placed on the fork (2), and of an elastic means (16) secured on the one hand to the clamp (11) and secured on the other hand to the magnetic means (17). The clamp (15) allows the body (10) of the device (1) to be adjusted in height and in rotation. For that, the clamp (15) is loosened from the housing (11), the housing (11) is slid and turned in the clamp (15), the clamp (15) is retightened, then being secured to the housing (11). Thus, the light beam (9) emitted by the device (1) is adjusted heightwise and laterally in order for the light mark (8) generated by the light beam (9) to strike the load (7) to be handled at the precise point where the forks (2) will be inserted. Advantageously, each of the two rapid ties (14) will be comprised of a clamp (15) of screw clamp type (15), of an elastic means (16) of rubber block type (16), and of a magnetic means (17) of pot magnet type (17).

The indexing means (18) is comprised of a thin plate (18) secured to the fork (2). This plate (18) has two piercings for receiving and indexing, accurately, the magnetic means (17) on the fork (2). These through-piercings are perfectly fitted to the outer form of the magnetic means (17). In the case of pot magnets (17) of circular form, the holes will be circular and of the same diameter as the pot magnets (17). The pot magnet (17) that will be fixed by magnetism onto the fork (2) will then always be correctly positioned on the latter. At any moment, it then becomes possible to remove the device (1) from the fork (2), then reinstall it later, without in any way losing the position settings thereof. The indexing means (18) is fixed to the fork (2), by way of examples, either by screwing, or by welding, or by bonding or even by double-sided self-adhesive tape.

The invention has also provided, in a compact version, the possibility of having only a single rapid tie (14). In this case, there is only a single magnetic means (17) associated with an indexing means (18) that then has only a single piercing.

With reference to FIG. 4.

The electronic means of the device (1) of the invention implements mainly an electrical battery (31), an accelerometer (32), a programmable microcontroller (33) and a module (37) for emitting a light beam (9).

The accelerometer (32) continuously measures the total acceleration vector (26) acting on the forks (2).

The microcontroller (33), loaded with a computer program and receiving the information from the accelerometer (32), determines by computations, continuously, the values of the components ($27x$, $27z$) of the gravity acceleration vector (27), the values of the component vectors ($28h$, $28v$) of the displacement acceleration vector (28), the inclination values (22), the speeds, displacements and horizontal and vertical positions of the forks (2). All these measured and computed values allow the microcontroller (33) to identify the current handling step and control the operation of the module (37) for emitting the light beam (9) as a function, on the one hand, of the identified handling step and, on the other hand, of said program.

The electrical battery (31), the accelerometer (32) and the microcontroller (33) are placed on an electronic circuit board (30). This electronic circuit board (30) will also be able to accommodate other components such as a voltage regulator (34), a plug (35), a transceiver module (38) and a voltage regulator (36).

The electrical battery (31) is either of disposable cell type, or of rechargeable battery type.

The accelerometer (32) is, by construction, secured to the electronic circuit board (30), which is itself secured to the rest of the device (1) of the invention, which is itself secured to the forks (2). The accelerometer (32) therefore permanently "sees" the total acceleration vector (26) applied to the forks (2). This total acceleration vector (26) is by its nature the sum of the gravity acceleration vector (27) and of the displacement acceleration vector (28) of the forks (2). This accelerometer (32) is the single sensor of information that the invention implements. It is preferably an accelerometer (32) of tri-axial type which is implemented by the invention.

The function of the voltage regulator (34) is to always maintain the correct operating voltage at the terminals of the accelerometer (32) and of the microcontroller (33). It therefore adjusts the voltage that the battery (31) supplies to it and uses all the energy contained in the latter until it is drained, and thus ensures a greater autonomy of operation of the device (1) of the invention.

The plug (35) allows a computer to be connected to the electronic circuit board (30) in order to inject or correct the computer program loaded in the microcontroller (33). That will, for example, be a mini-USB port (35).

The program is the translation into computer language of the different phases of the method of the invention. It will be able to use the subprograms and routines known to the person skilled in the art, or even supplied with the computing components such as the accelerometer (32) or the microcontroller (33). It will also be able to implement timers and filters allowing the operation of the method of the invention to be stabilized. The program will, for example, be able to be developed in "C" language which is well known to the person skilled in the art. The program will be able to be modified at any time to be then injected into the microcontroller (33). Thus, the invention is provided with a very flexible means for enhancing the existing functions, or even of providing the invention with new functions such as, for example, informing the driver of the level of charge of the batteries, of the speeds, or excessive inclinations of the machine by a specific modulation of the light beam (9).

According to a variant of the invention, the program can be remotely modified by wireless link. For that, a transceiver module (38) of Bluetooth type is placed on the electronic means. A smartphone (39), on the one hand outside the device (1), and on the other hand provided with a dedicated communication application, then communicates its program modifications to the transceiver module (38) of Bluetooth type.

The function of the voltage regulator (36) is to power the module (37) for emitting the light beam (9) always with the same voltage.

Figure 5:
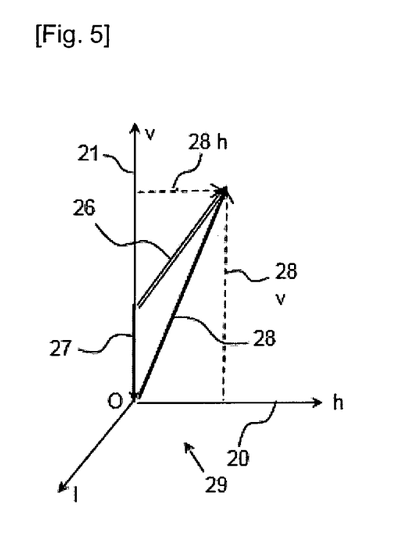
FIG. 5 is a diagram representing, in an orthonormal reference frame ohvl, the components of the total acceleration vector, and the components of the displacement acceleration vector.
Figure 6:
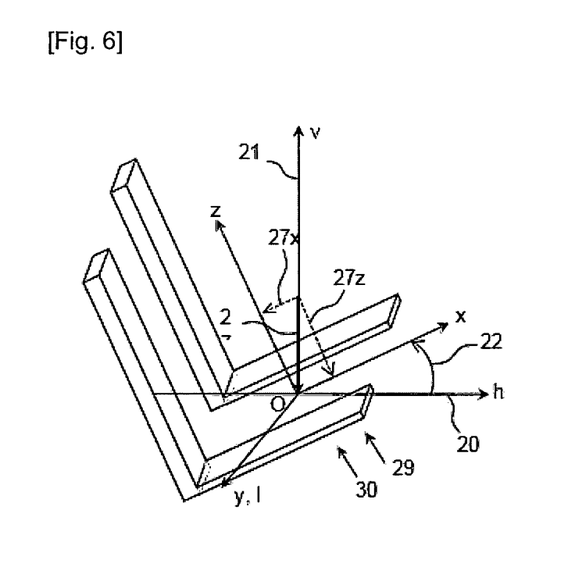
FIG. 6 represents a perspective view of the forks after inclination, in which the gravity acceleration vector and its components are distinguished according to an orthonormal reference frame oxyz that inclines with the forks.

With reference to FIGS. 5 and 6.

The measurements and computations relating to all the vectors involved in the invention are done in two orthonormal reference frames (29, 30), in other words three-axis reference frames. In these orthonormal reference frames (29, 30), each of the vectors is defined by its three component vectors. It is the values of these three components that the invention measures, computes and analyzes to determine the current handling step. It is to this end that the invention has chosen an accelerometer (32) of tri-axial type placed on the electronic circuit board (30) of the electronic means.

The first orthonormal reference frame ovhl (29) is a reference frame attached to the machine, a machine that is considered to move around most of the time on a horizontal plane. The vertical axis ov (21) of this orthonormal reference frame ovhl (29) will always coincide with the terrestrial vertical (21) and the horizontal axis oh of this reference frame will on the one hand always coincide with the terrestrial horizontal (20) and on the other hand will always be in the main axis of the machine, in other words in the front-rear axis of the machine. It is in this reference frame ovhl (29) that the total acceleration vector (26), the gravity acceleration vector (27), the displacement acceleration vector (28) and the component vectors (28h, 28v) of the displacement acceleration (28) are measured and computed.

The second orthonormal reference frame oxyz (30) is a reference frame that is also attached to the machine. The plane oxz of this orthonormal reference frame oxyz (30) is on the one hand always in the main axis of the machine and is inclined on the other hand by the same value and in the same direction as the forks. This "tilting" second orthonormal reference frame (30) is necessary to compute the inclination (22) of the forks (2). It is in this reference frame that the components (27x, 27y) of the gravity acceleration (27) are computed.

According to a preferential variant, the measurements and computations relating to all the vectors involved in the invention are done only on the one hand in the vertical plane reference frame ovh of the first orthonormal reference frame (29) and in the vertical plane reference frame oxz of the second orthonormal reference frame (30). In fact, in this variant, it is considered that the accuracy of the measurements and of the computations is sufficient to determine the current handling steps.

The invention has made the choice to activate the light beam only when that proves necessary. Thus, the light beam (9) is activated during at least one step chosen from among the set of the steps of the handling process. The step is identified by computations and analyses relating to just the measurement of the total acceleration vector (26) acting on the forks (2). The total acceleration vector (26) is naturally the resultant of the gravity acceleration vector (27) and of the displacement vector (28) of the forks (2).

Advantageously, the light beam (9) is activated during just the step of picking up of the load (7) to be handled. This pick-up step is identified, continuously, by the following phases of the method:
  extraction of the displacement acceleration vector (28) of the total acceleration vector (26) of the forks (2),
  extraction of the two component vectors (28h, 28v) of the displacement acceleration vector (28) of the forks (2),
  computation, by mathematical double integration with respect to time relating to said two component vectors (28h, 28v), of the speeds, horizontal and vertical displacements of the forks (2),
  verification that said forks (2) are currently being displaced vertically and that their horizontal displacement is slow, or even zero.

In a particular mode of operation, the light beam (9) is rendered inactive if the height of the arms (5) of the forks (2) with respect to the ground lies between two predetermined height values. The value of the height of the arms (5) of the forks (2) is identified and compared, continuously, to the two predetermined height values, by the following phases of the method:
  extraction of the displacement acceleration vector (28) of the total acceleration vector (26) of the forks (2),
  extraction of the vertical component vector (28v) of the displacement acceleration vector (28) of the forks (2),
  computation, by mathematical double integration with respect to time relating to said vertical component vector (28v), in order to determine the values of the speed, and of the vertical displacement of the forks (2),
  computation by summation of the displacements of the height of the forks,
  verification that the height of the forks (2) lies between the two predetermined height values,
  thus, the light beam (9) will be rendered inactive when it is at the height of the eyes of people located in front of the handling machine.

The invention has also provided for the operation of the device (1) to be automatically triggered as soon as a displacement acceleration (28) is detected, the triggering threshold and the duration of operation being adjustable.

Figure 7:
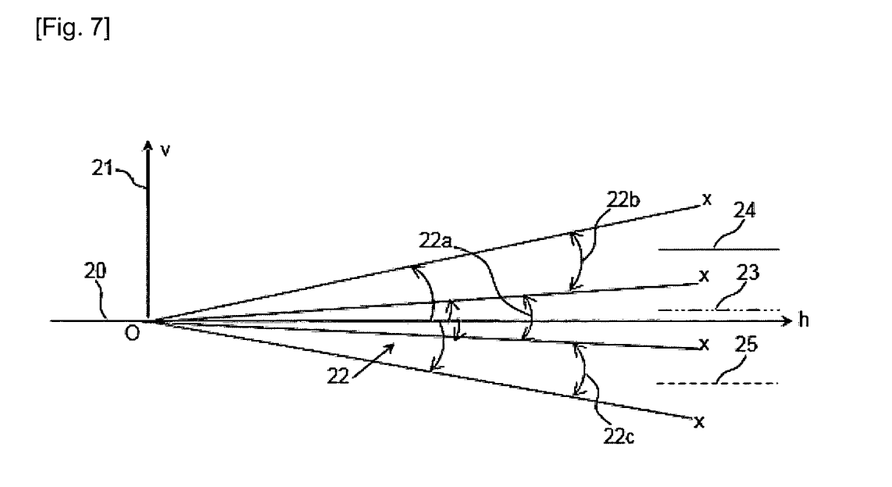
FIG. 7 represents a diagram of different modulation modes of the light beam as a function of the angle of inclination of the forks.

With reference to FIG. 7.

According to the invention, the light beam is rendered inactive if the forks are too inclined upward or downward and, by contrast, rendered active, or even modulated, if these inclinations are close to the horizontal (20).

Thus, according to a preferential embodiment, the light beam (9) is activated when the angle of inclination (22) of the arms (2) of the forks (5) with respect to the horizontal (20) lies between two predetermined angular values. The value of the angle of inclination (22) of the arms (2) of the forks (5) is identified, continuously, by the following phases of the method:
  extraction of the gravity acceleration vector (27) of the total acceleration vector (26) of the forks (2),
  extraction of the component vectors (27x, 27z) of the gravity acceleration vector (27) according to an orthonormal reference frame (30) that inclines with the forks (2),
  computation of the angle of inclination (22) of the arms (5) of the forks (2) with respect to a horizontal (20) by trigonometrical computation on the two component vectors (27x, 27z) of the gravity acceleration vector (27),
  verification that the angle of inclination (22) lies between the two predetermined angular values.

Advantageously, the light beam (9) is activated and modulated according to different modes (23, 24, 25) as a function of the angle of inclination (22) of the arms (5) of the forks (2) with respect to the horizontal (20):
  a first mode (23) when the angle of inclination (22) of the arms (5) of the forks (2) lies within an angular range (22a) close to the horizontal (20),
  a second mode (24) when the angle of inclination (22) of the arms (5) of the forks (2) lies within an angular range (22b) above the horizontal (20),
  a third mode (25) when the angle of inclination (22) of the arms (5) of the forks (2) lies within an angular range (22c) below the horizontal (20).

The value of the angle of inclination (22) of the arms (2) of the forks (5) is identified and compared to the angular ranges (22a, 22b, 22c), continuously, by the following phases of the method:
  extraction of the gravity acceleration vector (27) from the total acceleration vector (26) of the forks (2), extraction of the component vectors (27x, 27z) of the gravity acceleration vector (27) according to an orthonormal reference frame (30) that inclines with the forks (2), computation of the angle of inclination (22) of the arms (5) of said forks (2) with respect to a horizontal (20) by trigonometrical computation on the component vectors (27x, 27z) of the gravity acceleration (27), verification that the angle of inclination (22) lies within one of the different angular ranges (22a, 22b, 22c) and activation of the corresponding mode (23, 24, 25).

The modulation of the light beam (9) will preferentially take the forms of blinking or of bursts of flashes. Thus, the invention has a means allowing it, in the manner of the morse code, to give the driver information on the inclination (22) of the forks (2) but also other information such as, for example, the state of charge of the battery (31). The light beam (9) will preferentially be a beam of laser type. The form of the light mark (8) chosen will be such that it makes it possible to best view the point of entry of the forks (2) under the load (7). This will, for example, be able to be a line, two parallel lines, a dot. Generally, the light beam (9) will be from a module (37) for emitting light beams (9) with low energy consumption.

The device (1) of the invention will be of use to all the drivers of machines who want to improve their working conditions and reduce losses produced by handling.

The invention claimed is:

1. A method for assisting in the positioning of the arms of forks of a fork-lift handling machine which comprises:
    by means of a light beam projecting a light mark onto a load to be handled, informing said fork-lift handling machine's driver of the relative position of said arms of said forks with respect to said load to be handled to allow him or her to appropriately position said arms of said forks before inserting them, in total safety, under said load to be handled,
    activating said light beam during at least one step chosen from the set of steps of the handling process,
    identifying said step by computations and analyses relating solely to the measurement of the total acceleration vector acting on the forks,
    activating said light beam during a step of picking up of the load to be handled,
    identifying said step of picking up continuously, by the following phases of said method:
    extracting the displacement acceleration vector of the total acceleration vector of the forks,
    extracting the two component vectors of said displacement acceleration vector of the forks,
    computing, by mathematical double integration with respect to time relating to said two component vectors: of the speeds and of the horizontal and vertical displacements of the forks,
    verifying that said forks are in the process of vertical displacement and that their horizontal displacement is slow, or even zero.

2. The method as claimed in claim 1, further comprising rendering the light beam inactive if the height of the arms of the forks with respect to the ground lies between two predetermined height values, identifying the value of said height of said arms of said forks and comparing that to said two predetermined height values, continuously, by the following phases of said method:
    extracting the displacement acceleration vector of the total acceleration vector of the forks,
    extracting the vertical component vector of said displacement acceleration vector of the forks,
    computing, by mathematical double integration with respect to time relating to said vertical component vector: of the speed and of the vertical displacement of said forks,
    computing the height of the forks by the summation of said vertical displacements,
    verifying that said height of said forks lies between said two predetermined height values.

3. The method as claimed in claim 1, further comprising activating the light beam when the angle of inclination of the arms of the forks with respect to the horizontal lies between two predetermined angular values, identifying continuously the value of said angle of inclination of said arms of said forks by the following phases of said method:
    extracting the gravity acceleration vector of the total acceleration vector,
    extracting the component vectors of said gravity acceleration vector according to an orthonormal reference frame that inclines with said forks,
    computing said angle of inclination of said arms of said forks with respect to a horizontal by trigonometrical computation on said two component vectors of said gravity acceleration vector,
    verifying that said angle of inclination lies between said two predetermined angular values.

4. The method as claimed in claim 1, further comprising activating and modulating said light beam according to different modes as a function of the angle of inclination of said arms of said forks with respect to the horizontal:
    a first mode when said angle of inclination of said arms of said forks lies within an angular range close to the horizontal,
    a second mode when said angle of inclination of said arms of said forks lies within an angular range above the horizontal,
    a third mode when said angle of inclination of said arms of said forks lies within an angular range below the horizontal,
    identifying and comparing the value of said angle of inclination of said arms of said forks to said angular ranges, continuously, by the following phases of said method:
    extracting the gravity acceleration vector of the total acceleration vector,
    extracting the component vectors of said gravity acceleration vector according to an orthonormal reference frame that inclines with said forks,
    computing the angle of inclination of said arms of said forks with respect to a horizontal by trigonometrical computation on said component vectors of said gravity acceleration,
    verifying that said angle of inclination lies within one of said different angular ranges.

5. A device for assisting in positioning of the arms of forks of a fork-lift handling machine comprising:
    by means of a light beam projecting a light mark onto a load to be handled, informs said fork-lift handling machine's driver of the relative position of said arms of said forks with respect to said load to be handled to allow him or her to appropriately position said arms of said forks before inserting them, in total safety, under said load to be handled, the device comprising a hollow body, on the one hand installed on one of said forks and on the other hand containing an electronic means, for implementing an electrical battery, an accelerometer, a programmable microcontroller and a module for emitting a light beam, the body is comprised of a housing, on the one hand cylindrical and hollow and, on the other hand, closed by a top plug and a bottom plug, said body being linked to the fork by means of at least one rapid tie, itself comprised:

of a circular clamp, adjustable in diameter and placed on said housing, of a magnetic means placed on said fork, of an elastic means on the one hand secured to said clamp and on the other hand secured to said magnetic means, wherein the microcontroller and the module for emitting the light beam allow for assisting in the positioning of the arms of forks of the fork-lift handling machine by:

means of said light beam projecting a light mark onto a load to be handled, informing said fork-lift handling machine's driver of the relative position of said arms of said forks with respect to said load to be handled to allow him or her to appropriately position said arms of said forks before inserting them, in total safety, under said load to be handled, activating said light beam during at least one step chosen from the set of steps of the handling process, identifying said step by computations and analyses relating solely to the measurement of the total acceleration vector acting on the forks, activating said light beam during a step of picking up of the load to be handled, identifying said step of picking up continuously, by the following phases, extracting the displacement acceleration vector of the total acceleration vector of the forks, extracting the two component vectors of said displacement acceleration vector of the forks, computing, by mathematical double integration with respect to time relating to said two component vectors: of the speeds and of the horizontal and vertical displacements of the forks, verifying that said forks are in the process of vertical displacement and that their horizontal displacement is slow, or even zero.

6. The device as claimed in claim 5, wherein the clamp is of screw clamp type, the elastic means is a block of rubber, and the magnetic means is a pot magnet.

7. The device as claimed in claim 5, further comprising an indexing means of the magnetic means is secured to the fork; said indexing means being comprised of a thin plate secured to said fork, said plate having at least one piercing for receiving and indexing, accurately, said magnetic means on said fork.

8. The device as claimed in claim 5, wherein the microcontroller is loaded with a computer program which can be remotely modified, by wireless link, by means:

of a transceiver module, of Bluetooth type, placed on the electronic means, of a smartphone, on the one hand outside the device, and on the other hand provided with a dedicated communication application, said smartphone being able to communicate wirelessly with said transceiver module.

* * * * *